(12) United States Patent
Jonsson et al.

(10) Patent No.: US 11,924,683 B2
(45) Date of Patent: Mar. 5, 2024

(54) NETWORK NODE AND METHOD IN A WIRELESS COMMUNICATIONS NETWORK

(71) Applicant: Telefonaktiebolaget LM Ericsson (publ), Stockholm (SE)

(72) Inventors: Anders Jonsson, Täby (SE); Stefan Wahlman, Kista (SE); Jack Zeyu Song, Segeltorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 371 days.

(21) Appl. No.: 17/294,233

(22) PCT Filed: Nov. 14, 2019

(86) PCT No.: PCT/SE2019/051154
§ 371 (c)(1),
(2) Date: May 14, 2021

(87) PCT Pub. No.: WO2020/101561
PCT Pub. Date: May 22, 2020

(65) Prior Publication Data
US 2022/0022095 A1   Jan. 20, 2022

Related U.S. Application Data

(60) Provisional application No. 62/768,126, filed on Nov. 16, 2018.

(51) Int. Cl.
*H04W 28/06* (2009.01)
(52) U.S. Cl.
CPC .................. *H04W 28/06* (2013.01)
(58) Field of Classification Search
CPC .............. G05B 19/4185; H04W 28/06; H04W 72/1242; H04W 28/12; H04W 28/0289
See application file for complete search history.

(56) References Cited

U.S. PATENT DOCUMENTS 11,039,309 B2 * 6/2021 Gage ..................... H04W 80/02
11,184,798 B2 * 11/2021 Kwak ................... H04W 88/08
(Continued)

FOREIGN PATENT DOCUMENTS

WO    2019192941 A1    10/2019
WO    2019194735 A1    10/2019

OTHER PUBLICATIONS

International Search Report and Written Opinion dated Feb. 11, 2020 for International Application No. PCT/SE2019/051154 filed Nov. 14, 2019, consisting of 16-pages.
3GPP TS 23.501 V15.7.0; 3rd Generation Partnership Project; Technical Specification Group Services and System Aspects; System Architecture for the 5G System (5GS); Stage 2 (Release 15); Sep. 2019, consisting of 243-pages.
(Continued)

*Primary Examiner* — Syed Ali
(74) *Attorney, Agent, or Firm* — Christopher & Weisberg. P.A.

(57) ABSTRACT

A method performed by a first network node, for deciding a configuration to be used in a data communication between the first network node and a second network node in a wireless communications network is provided. The first network node receives a second message from the second network node. The second message includes user plane configuration information. The user plane configuration information includes a vendor identity of the second network node, a highest user plane protocol version supported by the second network node and a set of proprietary features of the vendor that are supported by the second network node. The second message is conveyed by using a frame structure according to a protocol specification that is being negotiated. The first network node decides a user plane vendor configuration to be used in the data communication between the first network node, and the second network node.

9 Claims, 13 Drawing Sheets

(56) References Cited

U.S. PATENT DOCUMENTS

| | | | |
|---|---|---|---|
| 2006/0282545 A1 | 12/2006 | Arwe et al. | |
| 2011/0075675 A1* | 3/2011 | Koodli | H04M 15/41 |
| | | | 370/401 |
| 2014/0187224 A1 | 7/2014 | Liu et al. | |
| 2018/0227904 A1 | 8/2018 | Raghunathan et al. | |
| 2020/0106536 A1* | 4/2020 | Bedekar | H04W 48/20 |
| 2020/0252862 A1* | 8/2020 | Kim | H04W 8/08 |
| 2020/0275356 A1* | 8/2020 | Forsman | H04L 41/0895 |
| 2020/0305054 A1* | 9/2020 | Zee | H04W 36/0061 |
| 2021/0058748 A1* | 2/2021 | Liao | H04W 76/11 |
| 2021/0112536 A1* | 4/2021 | Shah | H04L 5/0048 |
| 2021/0168653 A1* | 6/2021 | Arnold | H04W 28/0933 |
| 2021/0266915 A1* | 8/2021 | Sirotkin | H04L 47/41 |
| 2021/0352575 A1* | 11/2021 | Chun | H04W 72/02 |
| 2021/0368574 A1* | 11/2021 | Jonsson | H04W 24/02 |

OTHER PUBLICATIONS

3GPP TS 29.281 V15.4.0; 3rd Generation Partnership Project; Technical Specification Group Core Network and Terminals; General Packet Radio System (GPRS) Tunnelling Protocol User Plane (GTPv1-U) (Release 15); Sep. 2018, consisting of 32-pages.

3GPP TS 38.401 V15.3.0; 3rd Generation Partnership Project; Technical Specification Group Radio Access Network; NG-RAN; Architecture description (Release 15); Sep. 2018, consisting of 39-pages.

3GPP TS 38.425 V15.3.0; 3rd Generation Partnership Project; Technical Specification Group Radio Access Network; NG-RAN; NR user plane protocol (Release 15); Sep. 2018, consisting of 22-pages.

\* cited by examiner

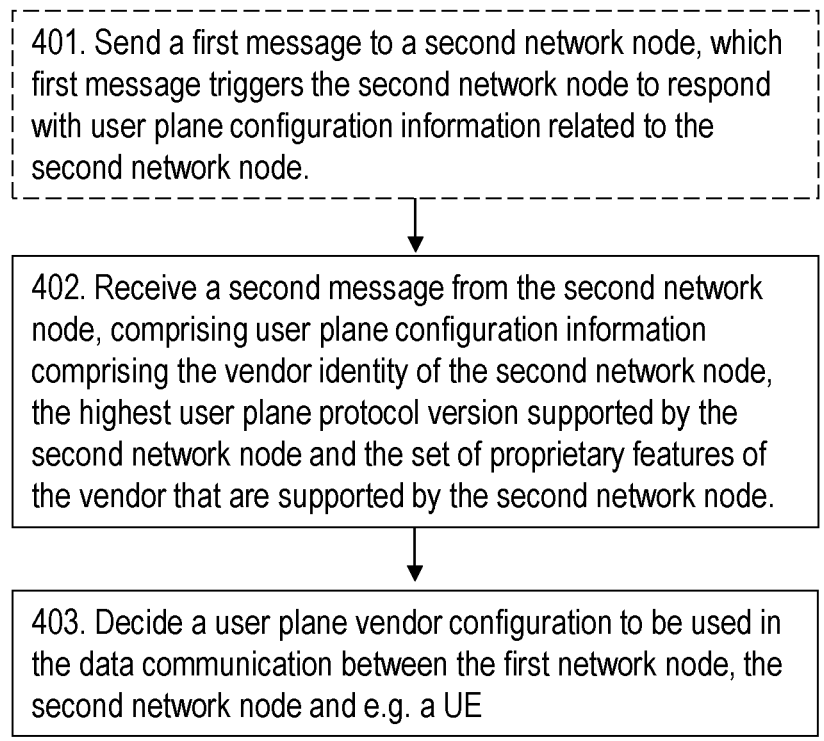
Fig. 4 Method in the first network node 111

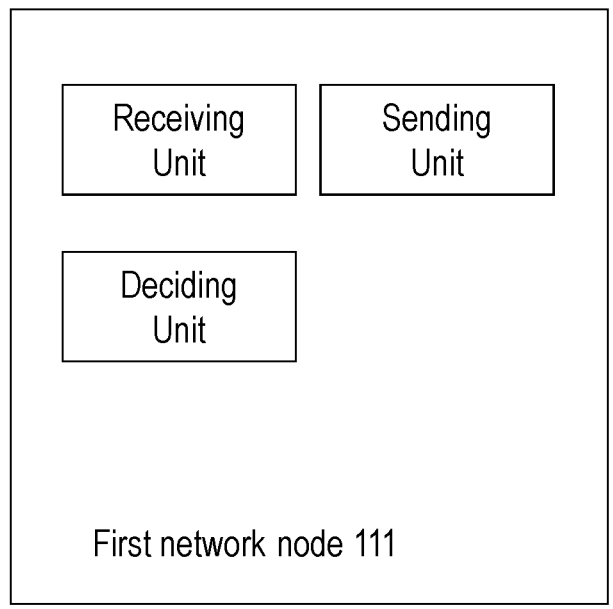
Fig. 9a
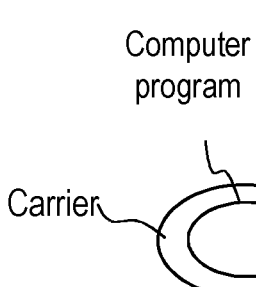
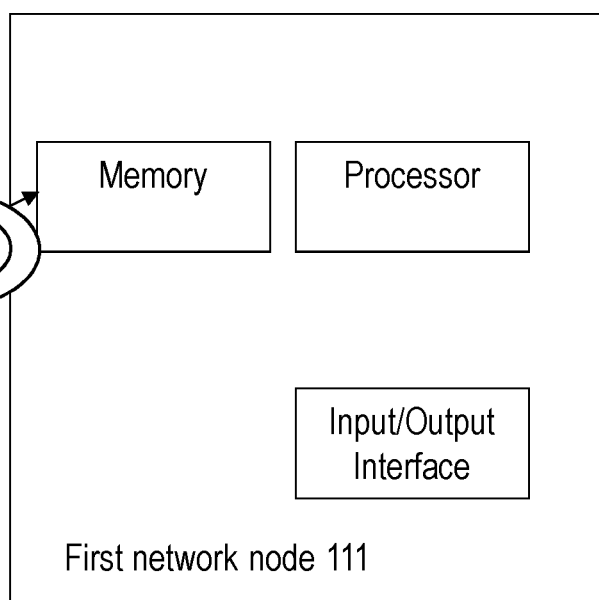
Fig. 9b

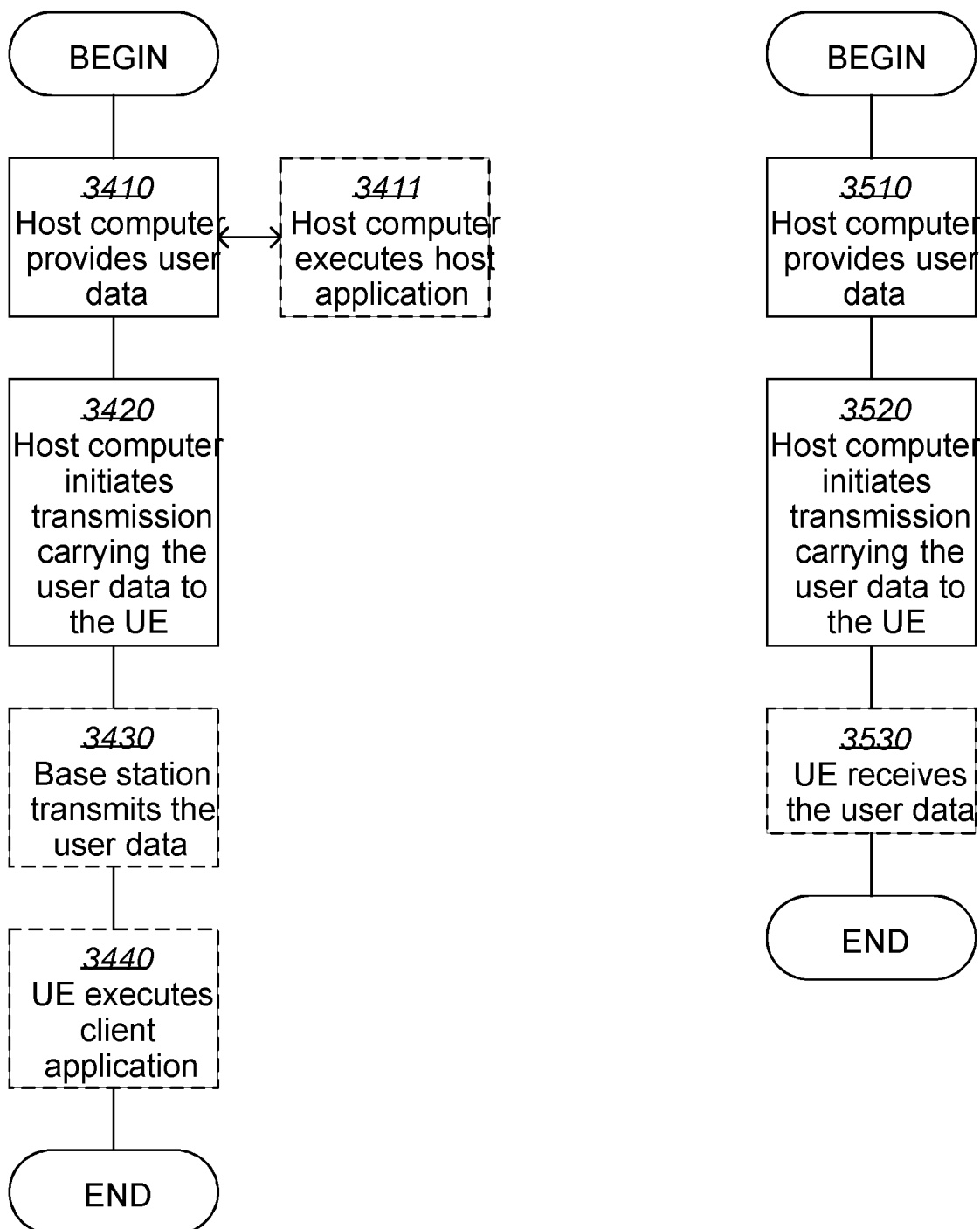

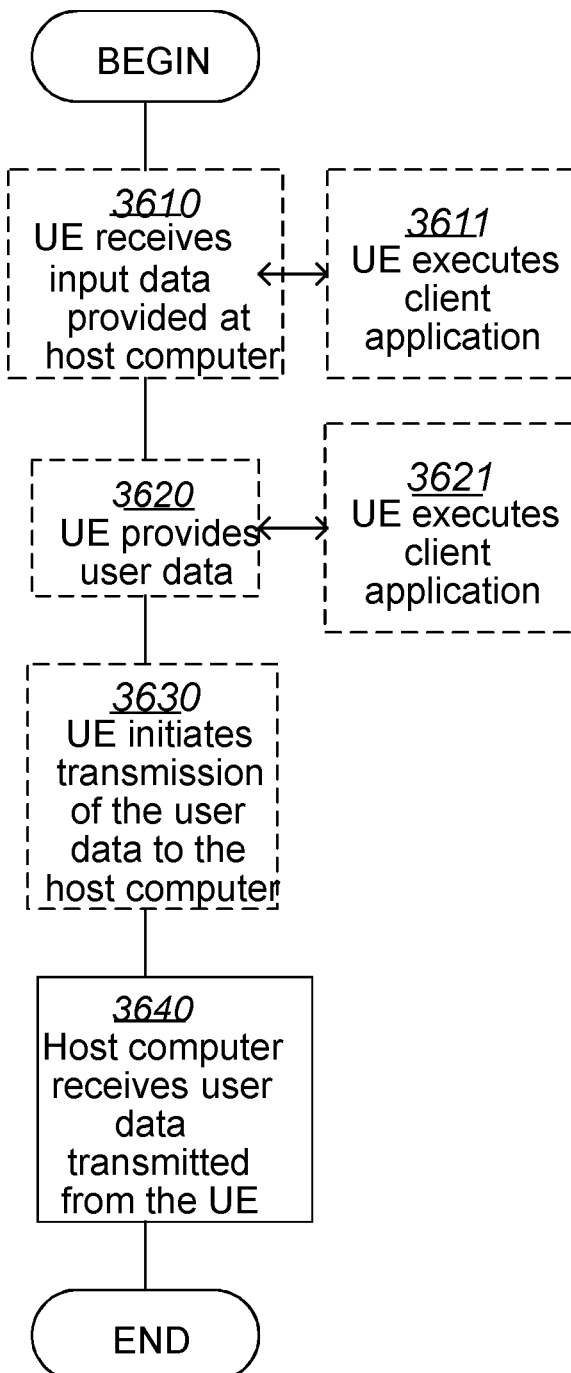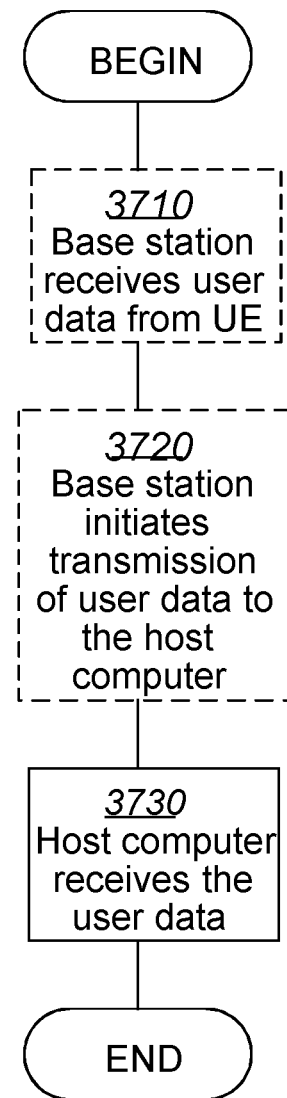
FIG. 14
FIG. 15

NETWORK NODE AND METHOD IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2019/051154, filed Nov. 14, 2019 entitled "METHOD FOR DECIDING CONFIGURATION TO BE USED IN A DTA COMMUNICATION BETWEEN A FIRST NETWORK NODE AND A SECOND NETWORK NODE," which claims priority to U.S. Provisional Application No.: 62/768,126, filed Nov. 16, 2018, entitled "NETWORK NODE AND METHOD IN A WIRELESS COMMUNICATIONS NETWORK," the entireties of both of which are incorporated herein by reference.

TECHNICAL FIELD

Embodiments herein relate to a first network node and a method therein. In particular, they relate to deciding a configuration to be used in a data communication between the first network node and a second network node in a wireless communications network.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as New generation (NG) and 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

The current 5G RAN also referred to as NG-RAN, architecture is described in 3GPP TS38.401 as follows. See FIG. 1. The NG architecture may be further described as follows:

- The NG-RAN comprises a set of gNBs connected to the Fifth Generation Core network (5GC) through the NG.
- A gNB can support Frequency Division Duplex (FDD) mode, Frequency Division Duplex (FDD) mode or dual mode operation.
- gNBs may be interconnected through the Xn interface.
- A gNB may comprise a gNB-Central Unit (CU) and gNB-Distributed Unit (DU)s.
- A gNB-CU and a gNB-DU are connected via F1 logical interface.
- One gNB-DU is connected to only one gNB-CU.
- NG, Xn and F1 are logical interfaces. For NG-RAN, the NG and Xn-C interfaces for a gNB comprising a gNB-CU and gNB-DUs, terminate in the gNB-CU. For EN-DC, the S1-U and X2-C interfaces for a gNB comprising a gNB-CU and gNB-DUs, terminate in the gNB-CU. The gNB-CU and connected gNB-DUs are only visible to other gNBs and the GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface such as NG, Xn, and F1, the related TNL protocol and the functionality are specified. The TNL provides services for user plane transport and signaling transport. In NG-Flex configuration, each gNB is connected to all Access and Mobility Management Function (AMF)s within an AMF Region. The AMF Region is defined in 3GPP TS 23.501.

SUMMARY

An object of embodiments herein is to improve the performance of a wireless communications network using handover.

According to an aspect of embodiments herein, the object is achieved by a method performed by a first network node, for deciding a configuration to be used in a data communication between the first network node and a second network node in a wireless communications network. The first network node receives a second message from the second network node. The second message comprises user plane configuration information. The user plane configuration information comprises a vendor identity of the second network node, a highest user plane protocol version supported by the second network node and a set of proprietary features of the vendor that are supported by the 15 second network node. The second message is conveyed by using a frame structure according to a protocol specification that is being negotiated. The first network node decides a user plane vendor configuration to be used in the data communication between the first network node and the second network node. The configuration is based on: the received information in the second message and a vendor identity of the first network node, a highest user plane protocol version supported by the first network node, and the set of proprietary features that are supported by the first network node.

According to another aspect of embodiments herein, the object is achieved by a first network node, for deciding a configuration to be used in a data communication between the first network node and a second network node in a wireless communications network. The first network node is configured to:

Receive a second message, from the second network node which second message is adapted to comprise user plane configuration information comprising the vendor identity of the second network node, the highest user plane protocol version supported by the 30 second network node and the set of proprietary features of the vendor that are supported by the second network node, wherein the second message are adapted to be conveyed by using a frame structure according to a protocol specification that is being negotiated, and decide a user plane vendor configuration to be used in the data communication between the first network node, the second network node, wherein the configuration is based on: the received information in the second message and a vendor identity of the first network node, the highest user plane protocol version supported by the first network node and the set of proprietary features that are supported by the first network node.

Since the second message is conveyed by using a frame structure according to a protocol specification that is being negotiated, and since the user plane vendor configuration to be used is decided is based on the received information in the second message and a vendor identity of the first network node, a highest user plane protocol version supported by the first network node, and the set of proprietary features that are supported by the first network node, embodiments herein consequently significantly reduces the risk of a configuration mismatches resulting in misinterpreted header fields or data being discarded and lost, erroneous interpretation of data and/or header information and deadlock situations.

This results in an improved performance of a wireless communications network using handover.

BRIEF DESCRIPTION OF THE DRAWINGS

Examples of embodiments herein are described in more detail with reference to attached drawings in which:

FIG. 4 is a flowchart depicting embodiments of a method in a first network node.

FIGS. 9 a and b are schematic block diagrams illustrating an embodiment of a first network node.

FIGS. 12-15 are flowcharts illustrating methods implemented in a communication system including a host computer, a base station and a user equipment.

DETAILED DESCRIPTION

Figure 1:
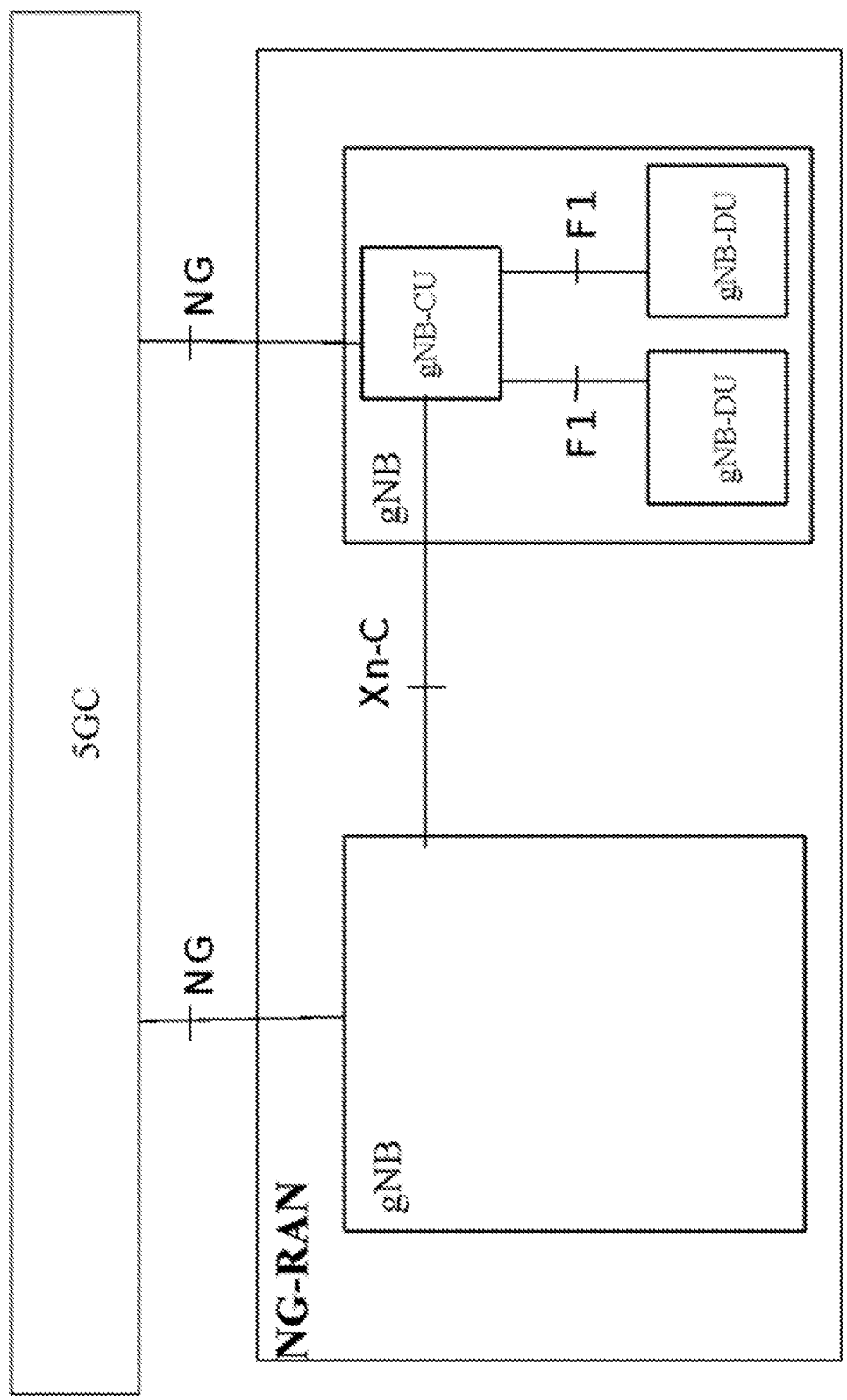
FIG. 1 is a schematic block diagram illustrating prior art t.

As a part of developing embodiments herein the inventors identified a problem which first will be discussed.

In Single and Dual- or Multi-Connectivity scenarios (henceforth referred to collectively as DC) data to a User Equipment (UE) may be sent either between Distributed Units (DU's) or connected to a Central Unit (CU) The user plane connection between the DU's and between the CU and the DU is the user plane protocol specification as defined in 3GPP TS 38.425. This specification is version controlled and the current latest version at the time of writing is 15.3.0. Since the first release, 15.0.0, the scope of the specification has increased and is expected to increase with new functionality in each subsequent release. Some of these additions will be optional while others mandatory to support. In addition, some vendors may desire to support additional functionality and consequently exchange proprietary information not covered by the standard, e.g. related to proprietary functionality such as enhanced flow control etc.

Consequently, a node that supports an earlier version release or receives proprietary information not covered by the standard may misinterpret some fields in the header structure which can cause problems ranging all the way from data being lost as discarded, erroneous interpretation of data to deadlock situations.

This means that it is important to ensure that the transmitting node is aware of the identity and capabilities of the other node and uses a protocol version and a set of optional and proprietary features, henceforth referred to as a configuration, which is compatible with the receiving node. Note that this does not automatically mean that both nodes need to have the same capabilities but need to use a compatible information exchange, i.e. use IE fields and header structures that both nodes support and interpret in the correct way, i.e. a compatible configuration must be used when communicating information between the nodes.

The first step in determining the appropriate configuration is to determine the vendor identity. When this has been established, a handshake between the nodes may be used to establish what version, optional and proprietary features are appropriate for the connection. It should also be noted that the configuration selected need not be static: Even if a certain configuration is selected at the set-up of the connection, the UE may during the call move to another location where it gets connected to another CU, DU or set DU's meaning that a new configuration needs to be selected. Note that the CU may be one unit or may be both logically and physically split into two separate functions that handle user plane and control data separately.

It also bears mentioning that a major disadvantage of doing the user plane version and multivendor handshake in the control plane prior to user plane setup is that depending on the architecture configuration, up to four different control plane protocols could be involved: X2-C, Xn-C, F1-C and potentially E1 in a virtualized NW. Consequently, it is an advantage if only an in-band method needs to be embodied as outlined in this disclosure. In-band signalling in this context means sending control information within the same protocol layer as used for data. This is in contrast to out-of-band signaling which is sent on a different, typically higher, protocol layer in the stack.

An object of embodiments herein is to improve the performance of a wireless communications network using handover.

Some embodiments herein relate to handling of feature functionality in 5G NR radio with specific focus on the user plane protocol in a scenario where the nodes involved are produced by different vendors, henceforth referred to as a Multi-Vendor (MV).

Embodiments herein provide a handshake procedure between a first network node 111 and a second network node 112 such as CU's and DU's to determine a suitable user plane configuration to use in both single and MV scenarios.

One example is to convey this information via in-band signaling in a General Packet Radio Service (GPRS) Tunneling Protocol-User plane (GTP-U) user plane data frame as outlined below. The functionality outlined herein will be especially beneficial in 5G DC scenarios involving multiple nodes produced by different vendors, such as e.g. the first network node 111 and the second network node 112.

In a deployment where the CU is split into a User Plane part (CU-UP) and a control plane part (CU-CP) connected over a standard interface, e.g. an 3GPP E1 interface, the information may be conveyed from the DU to the CU-UP. Based on this information, the CU-UP may take the decision on which configuration to use. The CU-UP may merge version information for different DUs and/or different nodes such as e.g. eNB and/or NG-RAN node, to take decisions. As yet another example, the CU-UP maybe in a mobility scenario, e.g. when a UE 120 connects to new DU/DU's, receive updated configuration information from connected DU's and based on this add new and/or reconfigure the user plane F1-U links to utilize new configurations based on the node capabilities.

It should also be noted that embodiments herein is also applicable in a scenario where a gNB is connected to a legacy LTE eNB.

An aim of embodiments herein is to add the capability to negotiate configuration information, e.g. user plane protocol version and a suitable set of optional and proprietary features, between the first and second network nodes 111, 112, by using a frame structure according to a protocol specification that is being negotiated, such as e.g. by utilizing in-band Private Enterprise Number (PEN) GTP-U signaling as defined in the 3GPP specification NR user plane protocol, TS 29.281.

Some advantages of embodiments provided herein may comprise.

The decided configuration such as e.g. a suitable configuration, i.e. user plane protocol version and a suitable set of optional, proprietary features can be negotiated between the involved first and second network nodes 111, 112. Embodiments herein consequently significantly reduces the risk of a configuration mismatches resulting in misinterpreted header fields or data being discarded and lost, erroneous interpretation of data and/or header information and deadlock situations. Example embodiments herein using a frame structure according to a protocol specification that is being negotiated also ensures that the suitable configuration information can be conveyed expediently and with minimal overhead compared to other more time consuming procedures like Radio Resource Signaling (RRC) procedures.

The functionality according to embodiments herein will be especially beneficial in 5G NR multivendor scenarios involving nodes from different vendors since the more nodes and different vendors are involved. A further advantage is that header structures and Information Elements (IE's) used are understood and interpreted in the right way by all involved network nodes. This also highlights the importance that the functionality outlined herein may for example be implemented as proprietary functionality that can be mutually agreed with co-operating vendors or may be adopted into the 3GPP standard.

Another advantage of applying the user plane version and multivendor handshake by using signalling comprising a frame structure according to a protocol specification that being negotiated, is that depending on architecture configuration, up to four different control plane protocols would be involved: X2-C, Xn-C, F1-C and potentially E1 in a virtualized network. Consequently, it is an advantage if only a signalling with a frame structure according to a protocol specification that is being negotiated, such as one in-band method, needs to be embodied as opposed to the user plane handshake procedure needing to be implemented in for different control plane protocols.

Figure 2:
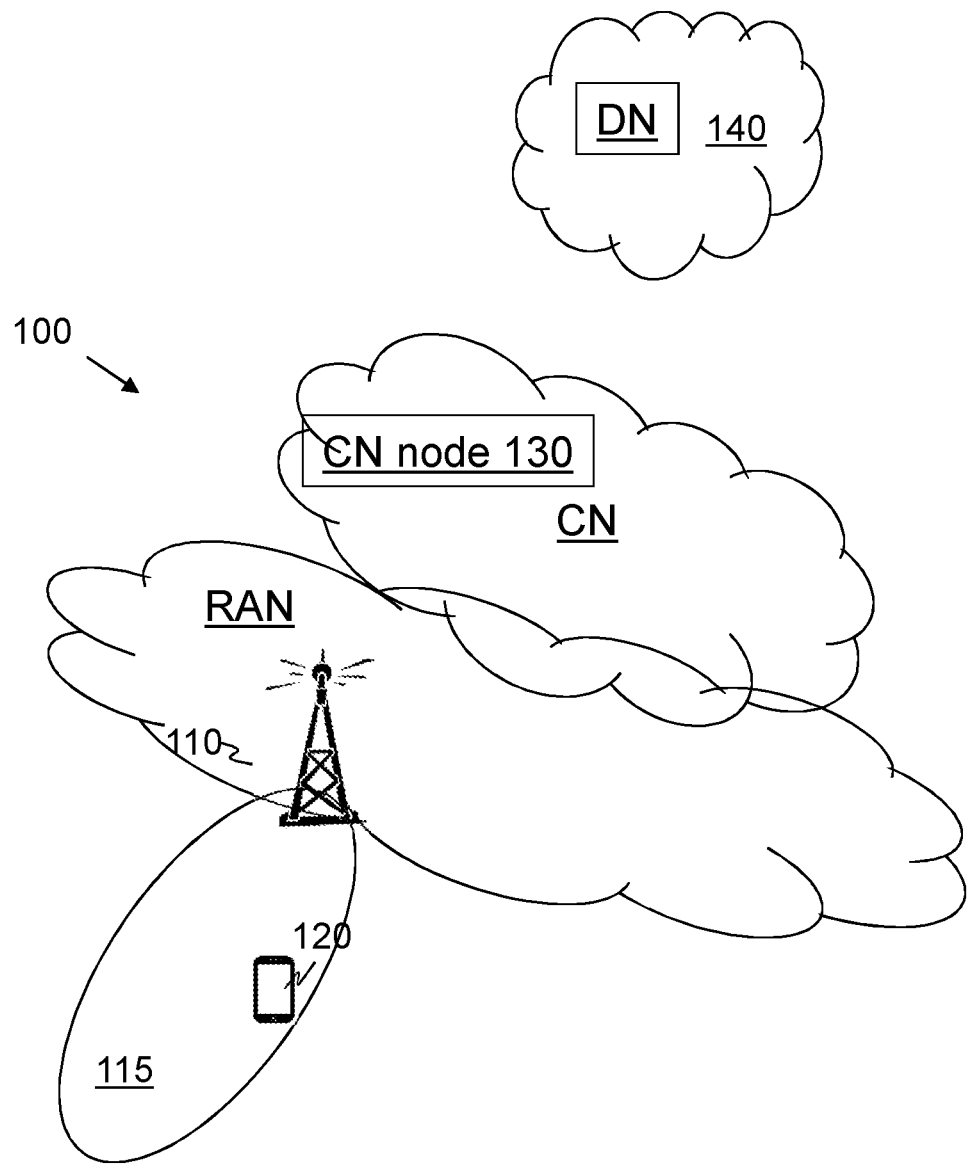
FIG. 2 is a schematic block diagram illustrating embodiments of a wireless communications network.

Embodiments herein relate to wireless communication networks in general. FIG. 2 is a schematic overview depicting a wireless communications network 100 wherein embodiments herein may be implemented. The wireless communications network 100 comprises one or more RANs and one or more CNs. The wireless communications network 100 may use a number of different technologies, such as Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a network node 110. The network network node 110 provides radio coverage over a geographical area, a service area referred to as a cell 115, which may also be referred to as a beam or a beam group of a first radio access technology (RAT), such as 5G, LTE, Wi-Fi or similar. The network node 110 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The network node 110 may be referred to as serving radio access nodes and communicates with a UE with Downlink (DL) transmissions to the UE and Uplink (UL) transmissions from the UE.

Figure 3A:
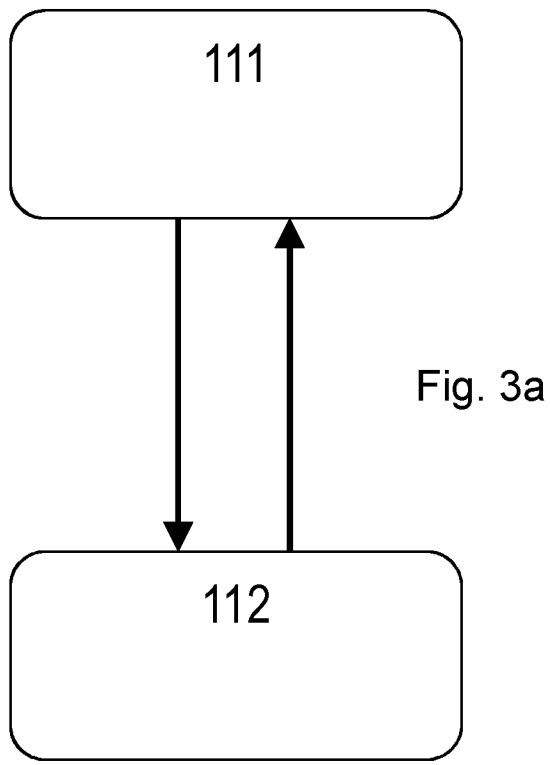
FIGS. 3 a and b are a schematic block diagrams depicting example embodiments.

The network node 110 may comprise a first network node 111 e.g. a CU such as a gNB-CU or an LTE eNB, and at least one second network node 112 e.g. a DU such as a gNB-DU or an LTE eNB. However, it may be the other way around, wherein the second network node 112 is a CU such as a gNB-CU or an LTE eNB, and the first network node 111 is a DU such as a gNB-DU or an LTE eNB. The first network node 111 and the second network node 112 is shown in FIG. 3*a*.

Example embodiments may comprise any one or more out of:
- The first network node 111 is a CU, and
  the second network node 112 is a DU,
- The first network node 111 is a Next generation NodeB (gNB)-CU, and
  the second network node 112 is a gNB-DU.
- The first network node 111 is a LTE eNB, and
  the second network node 112 is a gNB-DU.
- The first network node 111 is a gNB-CU, and
  the second network node 112 is an LTE eNB.
- The first network node 111 is a Fifth Generation, 5G, core node User Plane Function, UPF, and
  the second network node 112 is a gNB-CU.
- The first network node 111 is a Fourth Generation (4G) core node Serving Gateway (SGW), and
  the second network node 112 is a gNB-CU.
- The second network node 112 is a CU, and
  the first network node 111 is a DU.
- The second network node 112 is a gNB-CU, and
  the se first network node 111 is a gNB-DU.
- The second network node 112 is a LTE eNB, and
  the s first network node 111 is a gNB-DU.
- The second network node 112 is a gNB-CU, and
  the se first network node 111 is a LTE eNB.
- The second network node 112 is a 5G core node UPF, and
  the first network node 111 is a gNB-CU.
- The second network node 112 is a 4G core node SGW, and
  the first network node 111 is a gNB-CU.

A number of UEs operate in the wireless communication network 100, such as the UE 120. The UE 120 may be a mobile station, a non-access point (non-AP) STA, a STA, a user equipment and/or a wireless terminals, that communicate via one or more Access Networks (AN), e.g. RAN, e.g. via the source and/or target network nodes 111, 112 to one or more core networks (CN), e.g. comprising CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by network nodes such as the first network node 111, and the second network node 112. As an alternative, a Distributed Node (DN) and functionality, e.g. comprised in a cloud 140 as shown in FIG. 2, may be used for performing or partly performing the methods.

Embodiments herein are especially beneficial in a cloud implementation where the network nodes are physically separated from each other. For example, in a virtualized environment the nodes serving a UE such as the UE 120 may be both from different vendors and separated both physically and in the frequency domain meaning the suitable configuration to use may vary significantly over time and it is therefore especially important that the involved nodes can negotiate which user plane protocol versions and features to use.

Figure 3B:
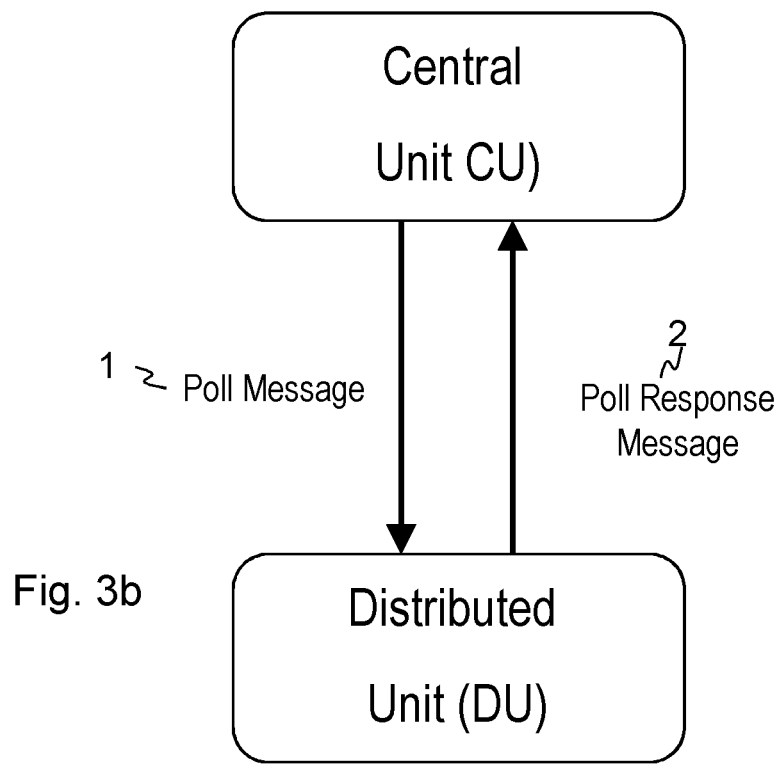

FIG. 3*b* depicts a vendor, version and feature handshake procedure embodiment wherein the first network node 111 is a CU and the second network node is a DU.

1. In this embodiment, the CU sends Poll Message also referred to as a first message, to trigger the DU to respond with vendor identity, highest supported protocol version and which set of proprietary features are supported. Note that the poll message comprises information about the vendor identity for the CU to enable the DU to know which set of proprietary features are relevant in this CU-DU vendor configuration.

2. The DU responds with Poll Response Message also referred to as a second message, comprising highest supported protocol version and which set of proprietary features are supported for this CU-DU vendor configuration.

It should be noted that the reverse message procedure is also possible, i.e. with the DU sending the Poll Message and the CU responding with the Poll Response Message.

FIG. 4 shows an example method performed by a first network node 111. The method may be for deciding a configuration to be used in a data communication between the first network node 111, the second network node 112 and e.g. the UE 120 in a wireless communications network 100. Embodiments herein thus provide a handshake procedure (Actions 401 and 402) between a first network node 111 and a second network node 112 such as CU's and DU's to determine also referred to as decide (in Action 403), a suitable user plane configuration that is applicable in both single and multivendor network node scenarios. The method is thus applicable in scenarios comprising the same or different vendors of the first network node 111 and the second network node 112. A vendor of a network node may e.g. mean a company owning the network node.

The method comprises one or more of the following actions, which actions may be taken in any suitable order:

Action 401.

This action is optional. The first network node 111 may send a first message, e.g. a polling message, to the second network node 112. A polling message is a message sent by the polling node to elicit a response from the polled node to secure that the communication to the polled node is working and that the polled node is in operation. The first, e.g. the polling message triggers the second network node 112 to respond with user plane configuration information related to the second network node 112. The first message is conveyed by using a frame structure according to a protocol specification that is being negotiated. This may also referred to as in-band signalling. An example of the frame structure of the first message will be described below. In the response to the poll in the first message from the first node, the second node in the second message identifies its vendor identity, the highest protocol version it supports and if applicable additional proprietary features that are applicable for the particular vendor configuration.

In some embodiments, the first message further comprises vendor information of the first network node 111. This is to ensure that the second network node 112 uses the correct user plane configuration applicable to communications with the first network node 111, since the second network node 112 may have different sets of user plane configurations applicable to different vendors.

The first message may be signalled in a GTP-U data frame.

In some embodiments this first message may not be sent.

Action 402.

When deciding the user plane vendor configuration to be used, it is important to ensure that the first network node 111 is aware of the identity and capabilities of the second network node 112 and uses a protocol version and a set of optional and proprietary features, which is compatible with the second network node 112.

Thus, the first network node 111 receives a second message from the second network node 112. The second message may e.g. be a polling response message. A polling response message is a message sent by the polled node to convey information to the polling node about the polled node's identity and support level for protocol versions and proprietary feature support applicable for the particular polling/polled vendor combination. The second message may be a response to the first message. However, in some embodiments the second network node sends the second message without having received any first message e.g. per automation when starting up a new connection for a data transmission to the UE 120. The second message comprises user plane configuration information. The user plane configuration information comprises a vendor identity of the second network node 112, a highest user plane protocol version supported by the second network node 112 and a set of proprietary features of the vendor that are supported by the second network node 112. A vendor identity of the network node is a unique identifier identifying the vendor of that network node 112. A highest user plane protocol version supported by a network node means the highest protocol version of the protocol to be used in transferring data and control information, e.g. the NG-RAN; NR user plane protocol, TS 38.425. A set of proprietary features of a vendor that are supported by a network node means features that are not defined in the 3GPP standard but that may be applicable for the particular polling/polled vendor combination. The second message is conveyed by using a frame structure according to a protocol specification that is being negotiated, also referred to as in-band signalling. An example of such frame structure will be described below.

The second message may be signalled in a GTP-U data frame.

Action 403.

The first network node 111 then compares the user plane configuration information of the second network node 112 received in the second message with its own corresponding user plane configuration information, and based on this the first network node 111 decides what user plane vendor configuration to setup.

Thus the first network node 111 then decides a user plane vendor configuration. The user plane vendor configuration may also be referred to as a vendor related user plane configuration. The user plane vendor configuration is to be used in the data communication between the first network node 111, the second network node 112 and e.g. the UE 120. The user plane vendor configuration is decided based on: The received information in the second message and a vendor identity of the first network node 111, the highest user plane protocol version supported by the first network node 111 and the set of proprietary features that are supported by the first network node 111. Thus the user plane vendor configuration is decided based on the following:

Vendor. The second network node 112 vendor derived from the identity of the second network node 112, and the first network node 111 vendor. These identities are used to determine the protocol version to be used and if applicable, which set of proprietary features are applicable for the particular polling/polled node combination as outlined below.

Highest user plane protocol version. The highest user plane protocol version supported by the first network node 111 compared with the highest user plane protocol version supported by the second network node 112. These are compared to determine which protocol version to use, i.e. which is the highest protocol version supported by both vendors.

Proprietary features. The set of proprietary features that are supported by the first network node 111 compared with the set of proprietary features that are supported by the second network node 112. This is a negotiation that is used to determine which set and version of proprietary features are applicable for the particular polling/polled node combination. These features are proprietary non-3GPP features that have been agreed between the vendors in bilateral agreements and may be subject to a type version handling, e.g. proprietary feature sets 1, 2 or 3 etc. Flow control schemes and radio quality measurements are examples of proprietary features that could be subject to this type of negotiation.

The above mentioned protocol specification that is being negotiated, may be negotiated between the involved first network node 111 and second network node 112.

Embodiments herein will now be further explained and exemplified and may be combined with embodiments as described above in any suitable way.

In-Band Configuration Control

It should be noted that the first message and the second message are conveyed by using a frame structure according to a protocol specification that is being negotiated, which is referred to as in-band signalling and in-band signalling control herein.

Figure 5:
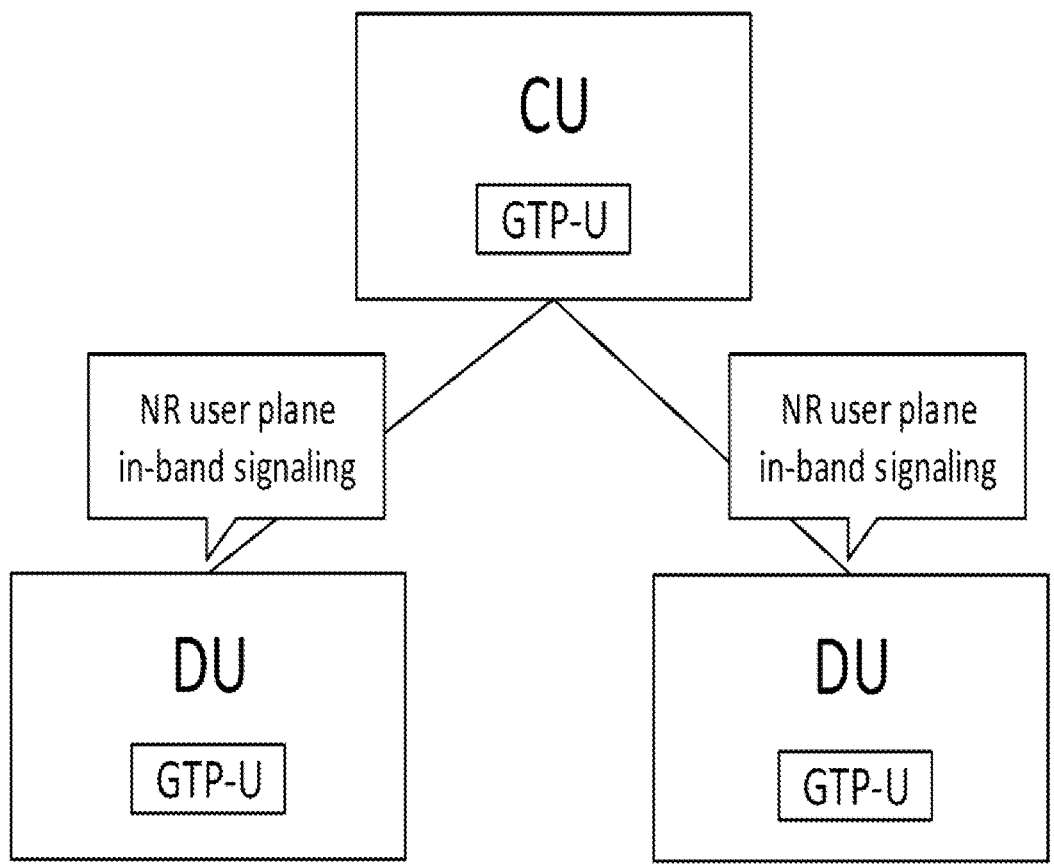
FIG. 5 is a schematic block diagram illustrating embodiments of an in-band signalling.

In some embodiments, the configuration control function resides in a CU such as the first network node 111, and uses feedback information from the DU/DU's such as the second network node 112 to determine which user plane vendor configuration to use. However, while an embodiment where the configuration control function resides in the CU an advantageous embodiment, alternative embodiments where the configuration control resides in the DU are also possible. See an example of the in-band signalling in FIG. 5 wherein the CU is represented by the first network node 111, and the DU/DU's are represented by the second network node 112. However, it may as well be the other way around, where the CU is represented by the second network node 112, and the DU/DU's are represented by the first network node 111. Further, it may relate to gNB-gNB and eNB-gNB as well.

The configuration control information between the first and second network nodes 111, 112 may be conveyed by any of the protocols connecting the CU and DU/DU's but in the in-band embodiment the General Packet Radio System (GPRS) Tunneling Protocol User Plane (GTPv1-U) NR as defined in 3GPP TS 29.281 using a Private Extension containing a Private Enterprise Number (PEN) is an advantageous embodiment such as method. The PEN is a unique identification number assigned by the Internet Assigned Numbers Authority (IANA) organization and this number may either be added to the 3GPP standard, e.g. to GTPv1-U, TS 29.281, version V15.4.0 (reference 2), to standardize the procedures outlined herein. Alternatively, the PEN number may be used between co-operating partners in a multivendor scenario based on a mutual agreement to use this as a means to identify protocol information intended to support configuration control. Details related to the signaling are further elaborated below.

The figures described below are only example embodiments based on the current frame IE's as defined in reference 2 and that other combinations of data fields, spare or reserved bits either in the presently defined or GTP-U frame types added later on into reference 2 may also be used to convey the configuration control information. As a non-limiting example, the configuration control information may be sent from a gNB-DU to a gNB-CU, between gNB's or from a gNB-DU to an LTE eNB or from an LTE eNB to a gNB-CU.

Downlink Version Control Information Handling

As a non-limiting example of a configuration control handshake, one of the nodes, the first network node 111, being e.g. a DU or a CU, initiates the procedure by sending a first message which in this example is a GTP-U PEN based Configuration Frame, henceforth referred to as a CF and exemplified in FIG. 6 which will be explained below, to the other node which is the second network node 112. In this GTP-U PEN based CF, the poll bit is set to 1, indicating that a response is required, and the vendor IE field is filled in with a predetermined number identifying the sender, i.e. the first network node 111. Thus the first message triggers the second network node 112 to respond with user plane configuration information related to the second network node 112.

The recipient of the poll, i.e. the second network node 112, replies with the second message which in this example is a CF. The second message CF comprises user plane configuration information, also referred to as user plane vendor configuration information, related to the second network node 112 which in this example comprises the replying vendor identity, highest supported reference 1 version and supported proprietary functionality. This information is then used by the first network node 111 in this example the polling node, to compare the received information in the second message and a vendor identity of the first network node 111, the highest user plane protocol version supported by the first network node 111 and the set of proprietary features that are supported by the first network node 111. In this example this means that the polling node compares the received IE's from the polled node with its own supported versions of 3GPP specification NR user plane, 3GPP TS 38.425, version V15.3.0 and supported proprietary functionality list and based on this determines what configuration to setup. Based on this, the first network node 111 decides a user plane vendor configuration to be used in the data communication between the first network node 111, the second network node 112 and e.g. the UE 120.

In addition, in another embodiment both version and support of proprietary features may be sent directly in the poll by the transmitting node, i.e. the first node 111 and the responding node, i.e. the second node 112 may reply with either the same version and what subset of the proprietary features it supports, or if it does not support that particular version, reply with the highest supported version and supported features set.

Note that the handshake procedures outlined above are non-limiting examples and that the procedure may either be a blind or acknowledged procedure, requiring that the nodes confirm the configuration before setup, or blind where the controlling node selects the configuration to be used directly based on the response of the other nodes capabilities.

Figure 6:
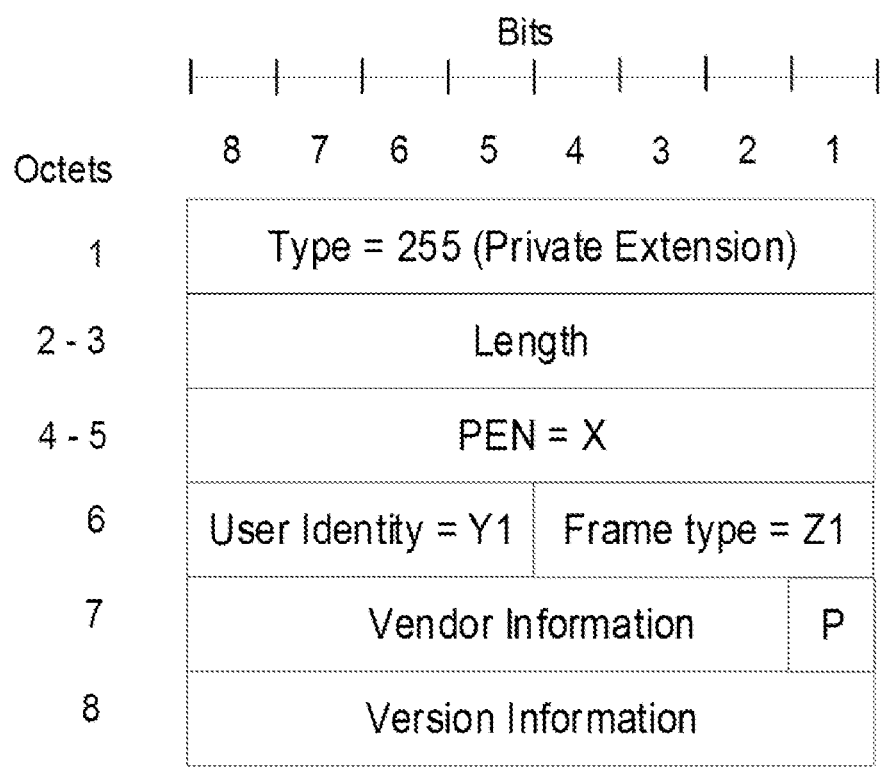
FIG. 6 is a schematic block diagram illustrating embodiments of a first message.

A non-limiting example of DL user data PDU with version control field is depicted in FIG. 6 showing the first message as a poll frame.

Octet 1 of the first message poll frame contains a Type=255 (Private extension) field which is used to identify the identify a Private extension.

Octets 2-3 of the first message poll frame contain a Length field which is used to specify the length of the private extension.

Octets 4-5 of the first message poll frame contain an PEN=X field comprising a PEN number which is a unique number from a series administered by IANA and assigned following an on-line application. Note that the vendors in a Multi-Connectivity (MC) scenario need to agree on which PEN number to use. This may be agreed on in interoperability talks between involved companies.

Octet 6 of the first message poll frame contains a Frame Type=Z1 field which is used to define what type of frame it is and consequently what information is carried in the "Vendor Information" field. Frame type Z1=Vendor Handshake Information. (0 is reserved for future use). A vendor handshake procedure according to embodiments herein using Frame type=1 may be used to determine if the other node e.g. is an Ericsson node or another vendor node, or to determine the vendor identity and level of functionality support in the other node in a:

Octet 6 of the first message poll frame further contains a User Identity=Y1 field. User Identity=Y1 is an internal vendor identity. (0 is reserved for future use). Since PEN numbers may be used by different branches within a company, the internal identity is used to indicate which particular branch of the company is using the PEN.Octet 7 of the first message poll frame contains a poll bit P field which is used to trigger a response from the poll recipient when set to "1" and no response when set to "0". Poll bit set to "1" since this is a poll frame used to elicit a response from other vendor.

Octet 7 of the first message poll frame further contains a Vendor information field which is used for an identity of the poll sender.

Octet 8 of the first message poll frame contains a Version information field which comprises information about the highest supported 3GPP TS 38.425 version.

Figure 7:
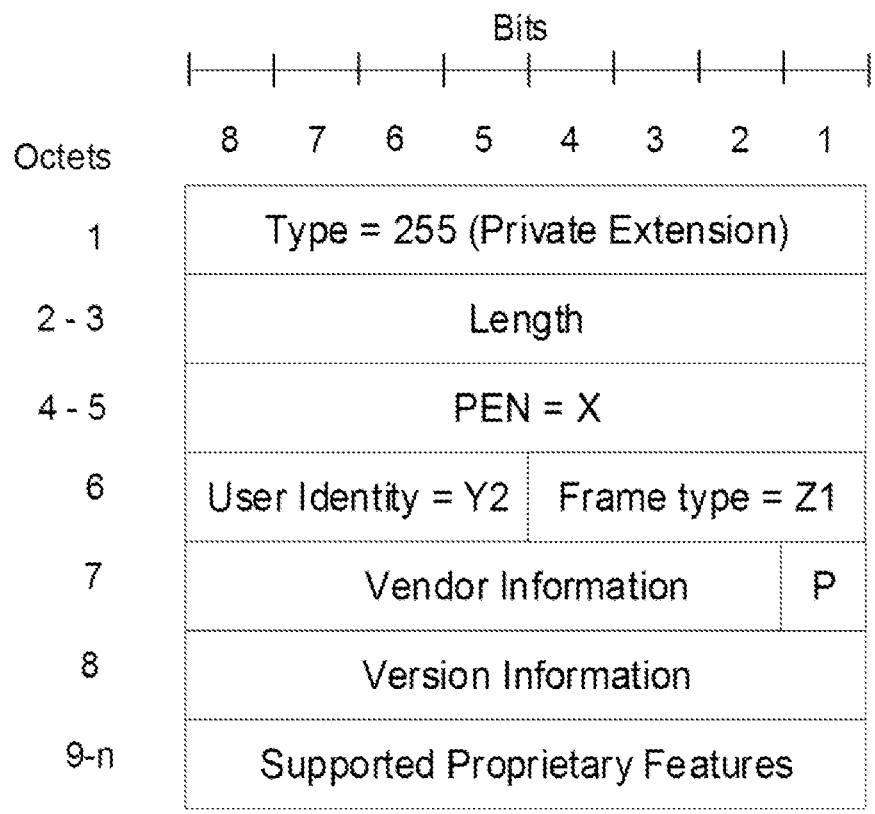
FIG. 7 is a schematic block diagram illustrating embodiments of a second message.

A non-limiting example of the second message, here a Poll response frame is depicted in FIG. 7. The second message poll response frame is made in a similar way as the first message poll frame but with additional Octets 9-n containing a supported proprietary Features field.

The PEN=X field comprises a PEN number from IANA. Note that the vendors in a MC scenario may need to agree on which number to use. This may be agreed on in interoperability talks between involved companies.

A vendor handshake procedure according to embodiments herein using Frame type=1 may be used to determine if the other node is e.g. an Ericsson node or another vendor node, or to determine the vendor identity and level of functionality support in the other node in a MV scenario. The Frame type Z1=Vendor Handshake Information. (0 is reserved for future use).

User Identity=Y2 is an internal vendor identity. (0 is reserved for future use). Since PEN numbers may be used by different branches within a company, the internal identity is used to indicate which particular branch of the company is using the PEN.

The Vendor information field is used to identify the identify the transmitter of this poll response frame. This is used to indicate the identify the vendor identity of the second network node 112.

Poll bit P is set to "0" since this is a poll response.

The Version information field Contains information about the highest supported 3GPP TS 38.425 version. This relate to the highest user plane protocol version supported by the second network node 112.

As mention above there is also the Supported Proprietary Features field comprised in the second message poll response frame. Since the poll frame contained information about the pollers vendor identity, the poll response may contain a list of the features both vendors support as per mutual agreement. Note that this may either be a list of all or a subset of all features supported for that version (octet 8) and that the length of the response is flexible (9 to n bytes).

Figure 8:
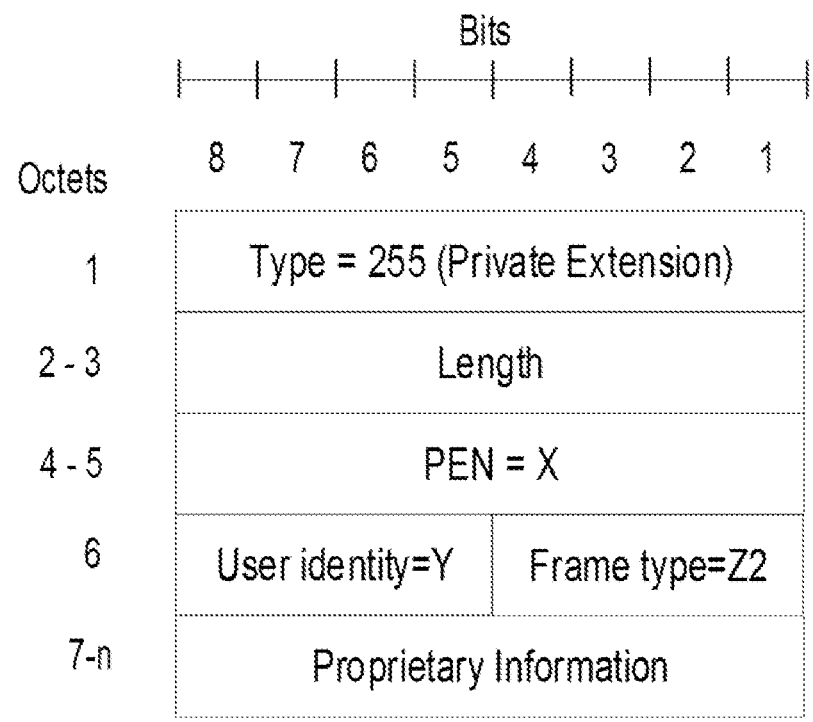
FIG. 8 is a schematic block diagram illustrating embodiments of a vendor proprietary information frame.

FIG. 8 depicts a Vendor Proprietary Information frame. This frame may be used to send and receive proprietary information element once the vendor handshake procedure has been done.

Octet 1 of the Vendor Proprietary Information frame contains a Type=255 (Private extension) field.

Octet 2-3 of the Vendor Proprietary Information frame contain a Length field.

Octet 4-5 of the Vendor Proprietary Information frame contain a PEN=X field.

Octet 6 of the Vendor Proprietary Information frame contains a User Identity=Y field and a Frame Type=Z2 field.

Octet 7-n of the Vendor Proprietary Information frame contain a Proprietary Information field.

The PEN=X field comprises a PEN number from IANA. Note that the vendors in a MC scenario need to agree on which number to use. This may be agreed on in interoperability talks between involved companies.

Note that before the Frame type=Z2 may be sent, a vendor handshake procedure using Frame type=2 may preferably have been done to establish the vendor of recipient node, e.g. an Ericsson node.

User Identity=Y is an internal vendor identity. (0 is reserved for future use). Since PEN numbers may be used by different branches within a company, the internal identity is used to indicate which particular branch of the company is using the PEN.

Frame type Z2 is used to indicate what type of proprietary information is carried in the frame, e.g. 1=UL Information, 2=DL Information, 3=Flow Control parameters or similar proprietary information etc. (0 is reserved for future use).

The proprietary information substructure is flexible both in terms of length and contents.

FIG. 9 a and b show a examples of the first network node 111. The first network node 111 in FIG. 9a comprises a receiving unit, a sending unit and a deciding unit.

The first network node 111 may comprise a respective input and output interface configured to communicate with each other, see FIG. 9b. The input and output interface may comprise a wireless receiver (not shown) and a wireless transmitter (not shown).

The embodiments herein may be implemented through a respective processor or one or more processors, such as the processor of a processing circuitry in the first network node 111 depicted in FIG. 9b together with computer program code for performing the functions and actions of the embodiments herein. The program code mentioned above may also be provided as a computer program product, for instance in the form of a data carrier carrying computer program code for performing the embodiments herein when being loaded into the first network node 111 One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory comprising one or more memory units. See FIG. 9b. The memory comprises instructions executable by the processor in the first network node 111.

The memory is arranged to be used to store e.g. configuration information and other information, data, configurations, and applications to perform the methods herein when being executed in the first network node 111.

In some embodiments, a respective computer program comprises instructions, which when executed by the at least one processor, cause the at least one processor of the first network node 111 to perform the actions above. See FIG. 9b.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium. See FIG. 9b.

Those skilled in the art will also appreciate that the units in the first network node 111, described above may refer to a combination of analog and digital circuits, and/or one or more processors configured with software and/or firmware, e.g. stored in the first network node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-12 are described below. The following embodiments refer to FIG. 3 a, FIG. 4, and FIGS. 9a,b.

Embodiment 1. A method performed by a first network node 111, e.g. for deciding a configuration to be used in a data communication between the first network node 111, a second network node 112 and e.g. a User Equipment, UE 120 in a wireless communications network 100, the method comprising:

receiving 402 a second message e.g. a polling response message, from the second network node 112 e.g. as a response to the first message, which second message comprises user plane configuration information comprising the vendor identity of the second network node 112, the highest user plane protocol version supported by the second network node 112 and the set of proprietary features of the vendor that are supported by the second network node 112, wherein the first message and the second message are conveyed by using a frame structure according to a protocol specification that is being negotiated, also referred to as in-band signalling, deciding 403 a user plane vendor configuration to be used in the data communication between the first network node 111, the second network node 112 and e.g. the UE 120, wherein the configuration is based on: the received information in the second message and a vendor identity of the first network node 111, the highest user plane protocol version supported by the first network node 111 and the set of proprietary features that are supported by the first network node 111.

Embodiment 2. The method according to embodiment 1, further comprising:

sending 401 a first message, e.g. a polling message, to the second network node 112, which first message triggers the second network node 112 to respond with user plane configuration information related to the second network node 112.

Embodiment 3. The method according to embodiment 1 or 2, wherein the first message further comprises vendor information of the first network node 111.

Embodiment 4. The method according to any of the embodiments 1-3, wherein any one or more out of:

the first network node 111 is a Central Unit, CU, and the second network node 112 is a Distributed Unit, DU, the first network node 111 is a gNB-CU, and the second network node 112 is a gNB-DU, the first network node 111 is a LTE eNB, and the second network node 112 is a gNB-DU, the first network node 111 is a gNB-CU, and the second network node 112 is a LTE eNB, the first network node 111 is a 5G core node UPF, and the second network node 112 is a gNB-CU, the first network node 111 is a 4G core node SGW, and the second network node 112 is a gNB-CU, the second network node 112 is a Central Unit, CU, and the first network node 111 a Distributed Unit, DU, the second network node 112 is a gNB-CU, and the se first network node 111 is a gNB-DU, the second network node 112 is a LTE eNB, and the s first network node 111 is a gNB-DU, the second network node 112 is a gNB-CU, and the se first network node 111 is a LTE eNB, the second network node 112 is a 5G core node UPF, and the first network node 111 is a gNB-CU, the second network node 112 is a 4G core node SGW, and the first network node 111 is a gNB-CU.

Embodiment 5. The method according to any of the embodiments 1-4, wherein the first and second messages are signaled in a respective GPRS Tunneling Protocol User plane, GTP-U data frame.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A first network node 111, e.g. for deciding a configuration to be used in a data communication between the first network node 111, a second network node 112 and e.g. a User Equipment, UE 120 in a wireless communications network 100, the first network node 111 being configured to:

receive, a second message e.g. a polling response message, from the second network node 112 e.g. as a response to the first message, which second message is adapted to comprise user plane configuration information comprising the vendor identity of the second network node 112, the highest user plane protocol version supported by the second network node 112 and the set of proprietary features of the vendor that are supported by the second network node 112, e.g. by means of a receiving unit in the first network node 111, wherein the first message and the second message are adapted to be conveyed by using a frame structure according to a protocol specification that is being negotiated, also referred to as in-band signalling, decide a user plane vendor configuration to be used in the data communication between the first network node 111, the second network node 112 and e.g. the UE 120, e.g. by means of a deciding unit in the first network node 111, wherein the configuration is based on: the received information in the second message and a vendor identity of the first network node 111, the highest user plane protocol version supported by the first network node 111 and the set of proprietary features that are supported by the first network node 111.

Embodiment 9. The first network node 111 according to embodiment 8, further being configure to:

send a first message, e.g. a polling message, to the second network node 112, which first message is adapted to trigger the second network node 112 to respond with user plane configuration information related to the second network node 112, e.g. by means of a sending unit in the first network node 111.

Embodiment 10. The first network node 111 according to embodiment 8 or 9, wherein the first message is adapted to further comprise vendor information of the first network node 111.

Embodiment 11. The first network node 111 according to any of the embodiments 8-10, wherein any one or more out of:

the first network node 111 is a Central Unit, CU, and the second network node 112 is a Distributed Unit, DU, the first network node 111 is a gNB-CU, and the second network node 112 is a gNB-DU, the first network node 111 is a LTE eNB, and the second network node 112 is a gNB-DU, the first network node 111 is a gNB-CU, and the second network node 112 is a LTE eNB, the first network node 111 is a 5G core node UPF, and the second network node 112 is a gNB-CU, the first network node 111 is a 4G core node SGW, and the second network node 112 is a gNB-CU, the second network node 112 is a Central Unit, CU, and the first network node 111 is a Distributed Unit, DU, the second network node 112 is a gNB-CU, and the se first network node 111 is a gNB-DU, the second network node 112 is a LTE eNB, and the s first network node 111 is a gNB-DU, the second network node 112 is a gNB-CU, and the se first network node 111 is a LTE eNB, the second network node 112 is a 5G core node UPF, and the first network node 111 is a gNB-CU, the second network node 112 is a 4G core node SGW, and the first network node 111 is a gNB-CU.

Embodiment 12. The first network node 111 according to any of the embodiments 8-11, wherein the first and second messages are adapted to be signaled in a respective GPRS Tunneling Protocol User plane, GTP-U data frame.

Below, some alternative Embodiments 8-12 are shown.

Embodiment 8. A first network node 111, e.g. for deciding a configuration to be used in a data communication between the first network node 111, a second network node 112 and e.g. a User Equipment, UE 120 in a wireless communications network 100, the first network node 111 comprising a processor and a memory containing instructions executable by the processor whereby the first network node 111 is configured to:

receive, a second message e.g. a polling response message, from the second network node 112 e.g. as a response to the first message, which second message is adapted to comprise user plane configuration information comprising the vendor identity of the second network node 112, the highest user plane protocol version supported by the 15 second network node 112 and the set of proprietary features of the vendor that are supported by the second network node 112, wherein the first message and the second message are adapted to be conveyed by using a frame structure according to a protocol specification that is being negotiated, also referred to as in-band signalling, decide a user plane vendor configuration to be used in the data communication between the first network node 111, the second network node 112 and e.g. the UE 120, wherein the configuration is based on: the received information in the second message and a vendor identity of the first network node 111, the highest user plane protocol version supported by the first network node 111 and the set of proprietary features that are supported by the first network node 111.

Embodiment 9. The first network node 111 according to embodiment 8, further being configure to:

send a first message, e.g. a polling message, to the second network node 112, which first message is adapted to trigger the second network node 112 to respond with user plane configuration information related to the second network node 112.

Embodiment 10. The first network node 111 according to embodiment 8 or 9, wherein the first message is adapted to further comprise vendor information of the first network node 111.

Embodiment 11. The first network node 111 according to any of the embodiments 8-10, wherein any one or more out of:

the first network node 111 is a Central Unit, CU, and the second network node 112 is a Distributed Unit, DU, the first network node 111 is a gNB-CU, and the second network node 112 is a gNB-DU, the first network node 111 is a LTE eNB, and the second network node 112 is a gNB-DU, the first network node 111 is a gNB-CU, and the second network node 112 is a LTE eNB, the first network node 111 is a 5G core node UPF, and the second network node 112 is a gNB-CU, the first network node 111 is a 4G core node SGW, and the second network node 112 is a gNB-CU, the second network node 112 is a Central Unit, CU, and the first network node 111 is a Distributed Unit, DU, the second network node 112 is a gNB-CU, and the se first network node 111 is a gNB-DU, the second network node 112 is a LTE eNB, and the s first network node 111 is a gNB-DU, the second network node 112 is a gNB-CU, and the se first network node 111 is a LTE eNB, the second network node 112 is a 5G core node UPF, and the first network node 111 is a gNB-CU, the second network node 112 is a 4G core node SGW, and the first network node 111 is a gNB-CU.

Embodiment 12. The first network node 111 according to any of the embodiments 8-11, wherein the first and second messages are adapted to be signaled in a respective GPRS Tunneling Protocol User plane, GTP-U data frame.

Figure 10:
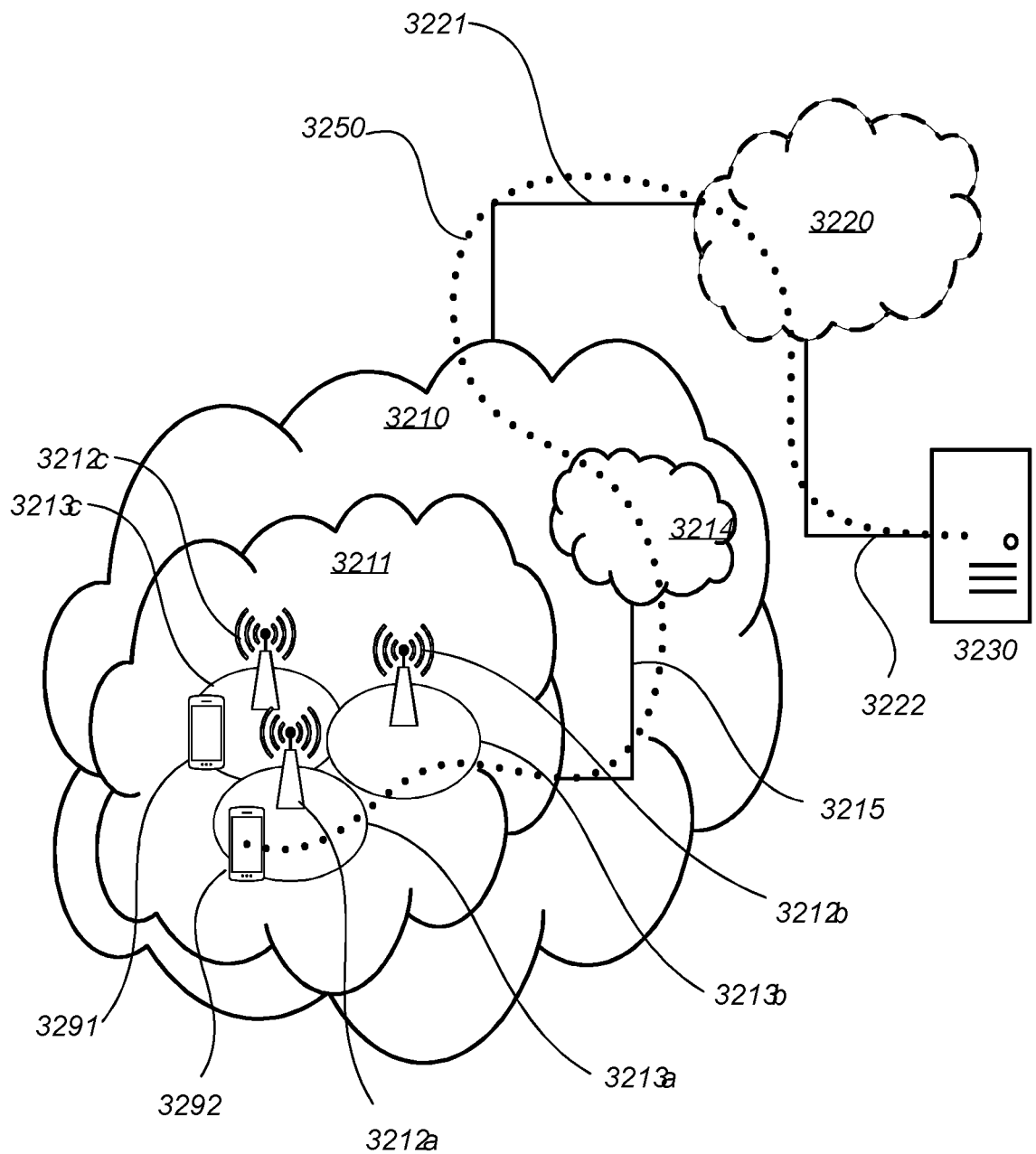
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target network node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
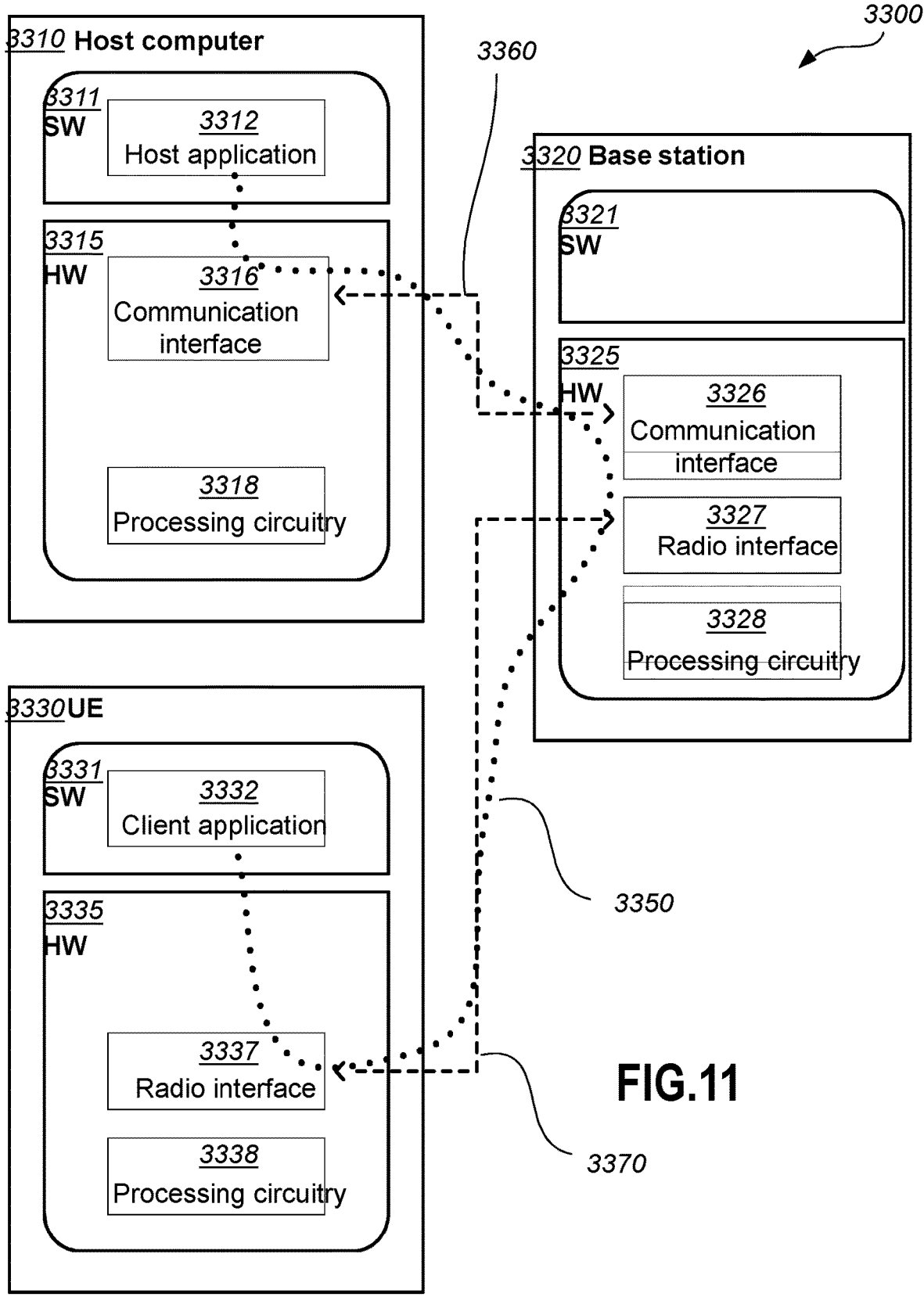
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| CF | Configuration Frame |
| CU | Central Unit |
| DC | Dual Connectivity |
| DU | Decentralized Unit |
| GTP-U | GPRS Tunneling Protocol User plane |
| IANA | Internet Assigned Numbers Authority |
| L1 | Layer 1 |
| MC | Multi-Connectivity |

-continued

| Abbreviation | Explanation |
| --- | --- |
| NGC | New Generation Core |
| NR | New Generation Radio |
| PDCP | Packet Data Convergence Protocol |
| PEN | Private Enterprise Number |
| UE | User Equipment |

The invention claimed is:

1. A method performed by a first network node, for deciding a configuration to be used in a data communication between the first network node and a second network node in a wireless communications network, the method comprising:
receiving a second message from the second network node, the second message including user plane configuration information including a vendor identity corresponding to a vendor owning the second network node, a highest user plane protocol version that is supported by the second network node, and a set of proprietary features of the vendor that are supported by the second network node, the second message being conveyed by using a frame structure according to a protocol specification that is being negotiated;
sending a first message to the second network node, the first message comprising vendor information of the first network node, and the first message triggering the second network node to respond with the user plane configuration information related to the second network node, the second message being received as a response to the first message, the first and second messages being signaled in a respective General Packet Radio Service, GPRS, Tunneling Protocol-User plane, GTP-U data frame; and
deciding a user plane vendor configuration to be used in the data communication between the first network node, the second network node, the user plane vendor configuration being based on:
the received information in the second message and a vendor identity of the first network node, a highest user plane protocol version that is supported by the first network node and a set of proprietary features that are supported by the first network node.

2. The method according to claim 1, wherein any one or more of:
the first network node is a Central Unit, CU, and the second network node is a Distributed Unit, DU;
the first network node is a Next generation NodeB, gNB,-CU, and the second network node is a gNB-DU;
the first network node is a Long Term Evolution, LTE, eNodeB, eNB, and the second network node is a gNB-DU;
the first network node is a gNB-CU, and the second network node is an LTE eNB;
the first network node is a Fifth Generation, 5G, core node User Plane Function, UPF, and the second network node is a gNB-CU;
the first network node is a Fourth Generation, 4G, core node Serving Gateway, SGW, and the second network node is a gNB-CU;
the second network node is a CU, and the first network node is a DU;
the second network node is a gNB-CU, and the first network node is a gNB-DU;

the second network node is an LTE eNB, and the first network node is a gNB-DU;
the second network node is a gNB-CU, and the first network node is a LTE eNB;
the second network node is a 5G core node UPF, and the first network node is a gNB-CU; and
the second network node is a 4G core node SGW, and the first network node is a gNB-CU.

3. The method according to claim 1, wherein the data communication is to be between the first network node, the second network node and further a User Equipment, UE in the wireless communications network.

4. The method according to claim 1, wherein any one or more of:
the first message is a polling message;
the second message is a polling response message;
the first message is conveyed by using a frame structure according to a protocol specification that is being negotiated; and
the protocol specification that is being negotiated, is negotiated between the involved first network node and second network node.

5. A non-transitory computer storage medium storing a computer program comprising instructions, which when executed by a processor, causes the processor to perform a method for deciding a configuration to be used in a data communication between a first network node and a second network node in a wireless communications network, the method comprising:
receiving a second message from the second network node, the second message including user plane configuration information including a vendor identity corresponding to a vendor owning the second network node, a highest user plane protocol version that is supported by the second network node, and a set of proprietary features of the vendor that are supported by the second network node, the second message being conveyed by using a frame structure according to a protocol specification that is being negotiated;
sending a first message to the second network node, the first message comprising vendor information of the first network node, and the first message triggering the second network node to respond with the user plane configuration information related to the second network node, the second message being received as a response to the first message, the first and second messages being signaled in a respective General Packet Radio Service, GPRS, Tunneling Protocol-User plane, GTP-U data frame; and
deciding a user plane vendor configuration to be used in the data communication between the first network node, the second network node, the user plane vendor configuration being based on:
the received information in the second message and a vendor identity of the first network node, a highest user plane protocol version that is supported by the first network node and a set of proprietary features that are supported by the first network node.

6. A first network node, for deciding a configuration to be used in a data communication between the first network node and a second network node in a wireless communications network, the first network node being configured to:
receive a second message from the second network node, the second message including user plane configuration information including a vendor identity corresponding to a vendor owning the second network node, a highest user plane protocol version that is supported by the second network node, and a set of proprietary features of the vendor that are supported by the second network node, the second message being conveyed by using a frame structure according to a protocol specification that is being negotiated;
send a first message to the second network node, the first message comprising vendor information of the first network node, and the first message triggering the second network node to respond with the user plane configuration information related to the second network node, the second message being received as a response to the first message, the first and second messages being signaled in a respective General Packet Radio Service, GPRS, Tunneling Protocol-User plane, GTP-U data frame; and
decide a user plane vendor configuration to be used in the data communication between the first network node and the second network node, the user plane vendor configuration being adapted to be based on: the received information in the second message and a vendor identity of the first network node, a highest user plane protocol version that is supported by the first network node and a set of proprietary features that are supported by the first network node.

7. The first network node according to claim 6, wherein any one or more of:
the first network node is a Central Unit, CU, and the second network node is a Distributed Unit, DU;
the first network node is a Next generation NodeB, gNB,-CU, and the second network node is a gNB-DU;
the first network node is a Long Term Evolution, LTE, eNodeB, eNB, and the second network node is a gNB-DU;
the first network node is a gNB-CU, and the second network node is an LTE eNB;
the first network node is a Fifth Generation, 5G, core node User Plane Function, UPF, and the second network node is a gNB-CU;
the first network node is a Fourth Generation, 4G, core node Serving Gateway, SGW, and the second network node is a gNB-CU;
the second network node is a CU, and the first network node is a DU;
the second network node is a gNB-CU, and the first network node is a gNB-DU;
the second network node is an LTE eNB, and the first network node is a gNB-DU;
the second network node is a gNB-CU, and the first network node is a LTE eNB;
the second network node is a 5G core node UPF, and the first network node is a gNB-CU; and
the second network node is a 4G core node SGW, and the first network node is a gNB-CU.

8. The first network node according to claim 6, wherein the data communication is to be between the first network node, the second network node and further a User Equipment, UE in the wireless communications network.

9. The first network node according to claim 6, wherein any one or more out of:
the first message is adapted to be a polling message; and
the second message is adapted to be a polling response message;
the first message is adapted to be conveyed by using a frame structure according to a protocol specification that is being negotiated; and the protocol specification that is being negotiated, is negotiated between the involved first network node and second network node.

* * * * *